United States Patent
Ziolek

(10) Patent No.: US 10,357,955 B2
(45) Date of Patent: Jul. 23, 2019

(54) METHOD FOR FORMING A 3D PRINTED SEAT SUPPORT SYSTEM

(71) Applicants: Hyundai America Technical Center, Inc, Superior Township, MI (US); Hyundai Motor Company, Seoul (KR); Kia Motors Corporation, Seoul (KR)

(72) Inventor: Scott Ziolek, Ann Arbor, MI (US)

(73) Assignees: Hyundai America Technical Center, Inc, Superior Township, MI (US); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 485 days.

(21) Appl. No.: 15/133,927

(22) Filed: Apr. 20, 2016

(65) Prior Publication Data
US 2017/0305093 A1 Oct. 26, 2017

(51) Int. Cl.
B29C 41/02 (2006.01)
B33Y 10/00 (2015.01)
(Continued)

(52) U.S. Cl.
CPC .............. B33Y 10/00 (2014.12); B29C 64/10 (2017.08); B29C 64/106 (2017.08);
(Continued)

(58) Field of Classification Search
CPC .............. B28B 1/001; B29C 64/00–40; B29L 2031/774; B29L 2031/7742
(Continued)

(56) References Cited

U.S. PATENT DOCUMENTS

| 3,428,975 A | 2/1969 | Gamelcy et al. |
| 2014/0255647 A1 | 9/2014 | Johnson et al. |

(Continued)

FOREIGN PATENT DOCUMENTS

| CN | 101484046 A | 7/2009 |
| CN | 101543357 A | 9/2009 |

(Continued)

OTHER PUBLICATIONS

Novedge BLOG.com/Dec. 2014: Durotaxis Chair: Conversations on 3D Printing and Architectural Design.
(Continued)

*Primary Examiner* — Leo B Tentoni
(74) *Attorney, Agent, or Firm* — Mintz Levin Cohn Ferris Glovsky and Popeo, P.C.; Peter F. Corless

(57) ABSTRACT

A method for forming a three-dimensionally (3D) printed flexible support apparatus includes: producing arrays of V-spring elements using a 3D printing system, each array including a plurality of V-spring elements arranged in a predefined array shape, and each V-spring element having a predefined firmness or hysteresis characteristic; arranging the arrays of V-spring elements in at least one two-dimensional (2D) array grid using the 3D printing system, such that at least one V-spring element of each array is attached to a V-spring element of at least one adjacent array; and shaping the at least one array grid according to a predefined volume to form the support apparatus.

21 Claims, 11 Drawing Sheets

(51) Int. Cl.
*B29C 64/118* (2017.01)
*B29C 64/171* (2017.01)
*B29C 64/106* (2017.01)
*B29C 64/112* (2017.01)
*B33Y 50/02* (2015.01)
*B33Y 80/00* (2015.01)
*B29C 64/10* (2017.01)
*B29L 31/00* (2006.01)
*B29K 75/00* (2006.01)
*B29K 105/04* (2006.01)

(52) U.S. Cl.
CPC .......... *B29C 64/112* (2017.08); *B29C 64/118* (2017.08); *B29C 64/171* (2017.08); *B33Y 50/02* (2014.12); *B33Y 80/00* (2014.12); *B29K 2075/00* (2013.01); *B29K 2105/04* (2013.01); *B29L 2031/751* (2013.01); *B29L 2031/774* (2013.01); *B29L 2031/7742* (2013.01)

(58) Field of Classification Search
USPC .......................... 264/113, 129, 308, 401, 497
See application file for complete search history.

(56) References Cited

U.S. PATENT DOCUMENTS

| | | | |
|---|---|---|---|
| 2014/0259785 A1* | 9/2014 | Lester ................. | A43B 13/026 36/102 |
| 2015/0014510 A1* | 1/2015 | Dunning ............... | F16F 15/073 248/618 |
| 2015/0123298 A1 | 5/2015 | Napadensky | |

FOREIGN PATENT DOCUMENTS

| | | | |
|---|---|---|---|
| CN | 104062461 A | 9/2014 | |
| KR | 10-2006-0003798 | 1/2006 | |
| WO | WO-2013020895 A1 * | 2/2013 | ........ B29L 2031/774 |

OTHER PUBLICATIONS wired.com/Oct. 3, 2014—Biomimicry 3D Printed Soft Seat: a 3-D printed Seat With a Cellular Structure That Molds to your Butt.

* cited by examiner

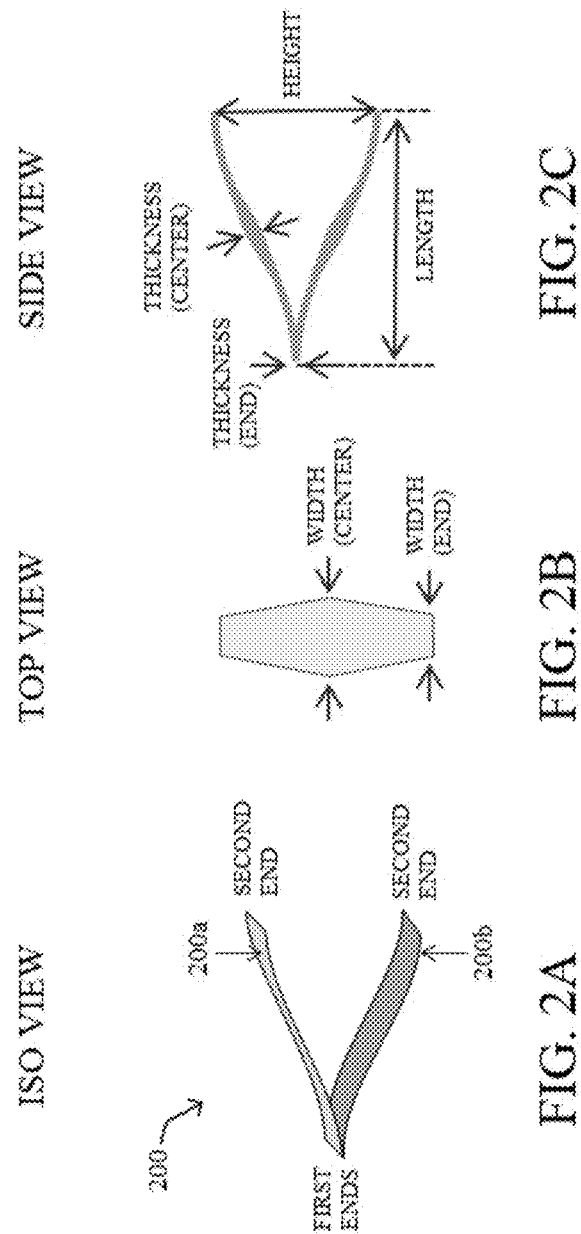

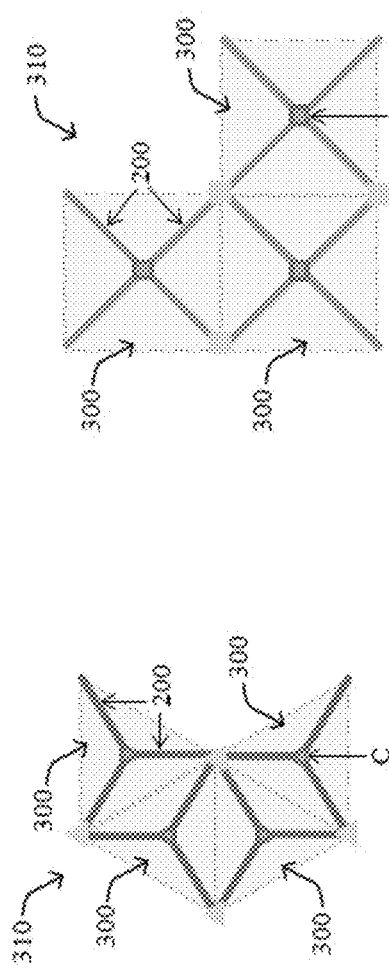
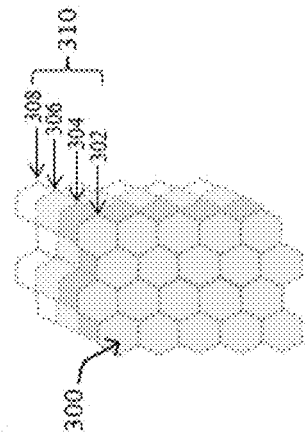
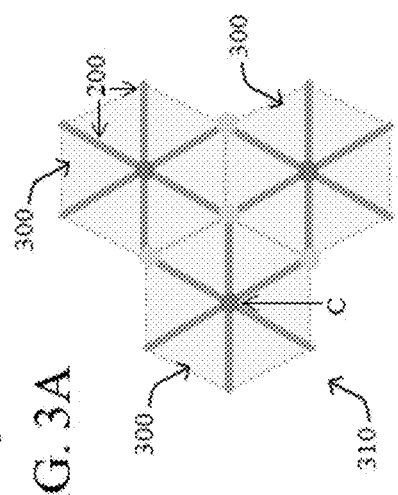
FIG. 3A
FIG. 3B
FIG. 3C
FIG. 3D

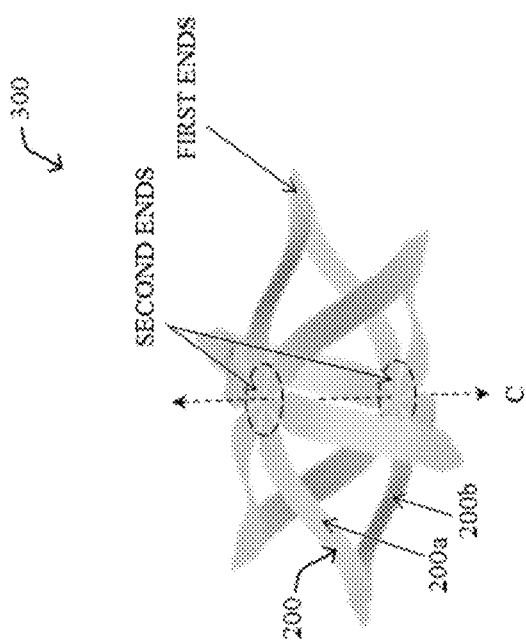

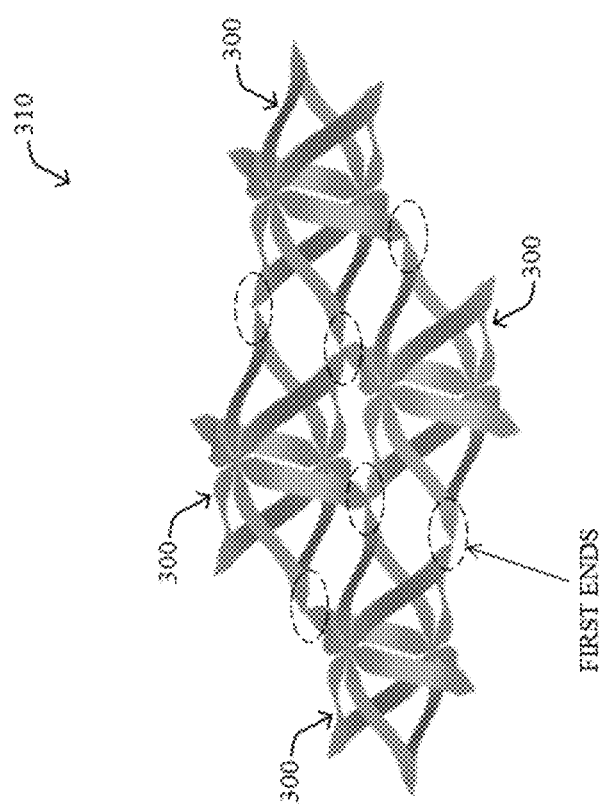

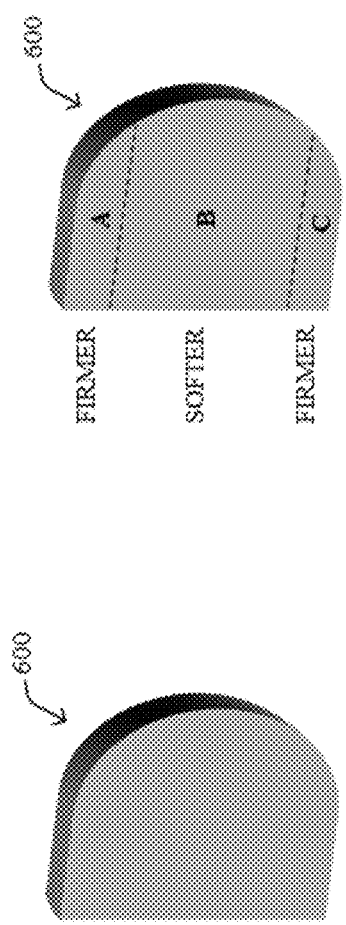
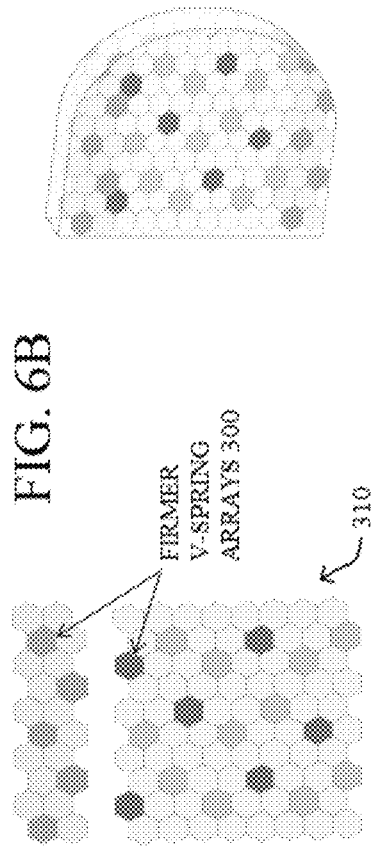
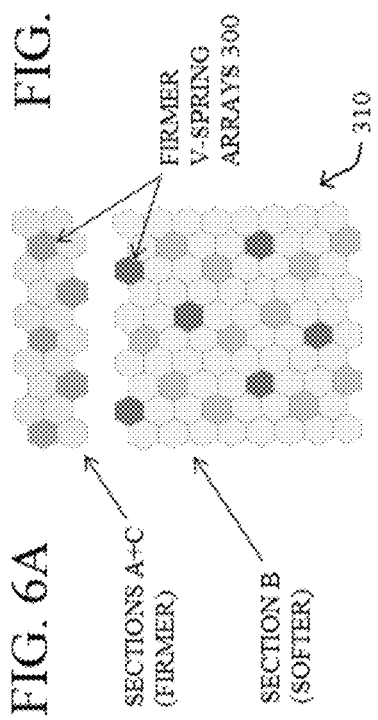
FIG. 6A
FIG. 6B
FIG. 6C
FIG. 6D

METHOD FOR FORMING A 3D PRINTED SEAT SUPPORT SYSTEM

TECHNICAL FIELD

The present disclosure relates generally to three-dimensional (3D) printing techniques, and more particularly, to a 3D-printed flexible support apparatus.

BACKGROUND

Since the advent and recent proliferation of 3D printing, otherwise known as additive manufacturing, countless structures previously manufactured using traditional techniques and materials have been replicated using 3D printing techniques. Manufacturers have shown that 3D printing can be used to make virtually any type of product, ranging from simple household items to complex industrial components to—eventually—human organs. Even vehicles have been recently manufactured using 3D printing systems.

Notably, the structural discrepancies between traditionally manufactured products and 3D-printed products are often virtually undiscernible. However, certain characteristics are difficult to reproduce using 3D printing tools. One notable example includes flexibility which, in the case of seats (or cushions, pillows, mattresses, etc.), provides comfort for the user. Traditionally, foam, such as polyurethane, has been poured and molded into a desired shape, and flexible structures are formed during the foaming process that provide both flexibility and support. On the other hand, 3D-printed objects often feel relatively rigid in comparison to foam-filled structures. Because the comfortableness of a seat is an essential feature that affects whether a user can, or is willing to, sit in the seat for extended periods of time, techniques for producing a flexible 3D-printed support apparatus are required in order for such products to be accepted by consumers.

SUMMARY

The present disclosure provides techniques for manufacturing a 3D-printed flexible support apparatus that simulates the structure of a foam support apparatus. The 3D-printed flexible support apparatus utilizes repeatable V-spring elements with predefined characteristics that allow for designers to control the firmness or degree of hysteresis of the structure or even certain sections of the structure. The V-spring elements can be grouped in arrays according to a predefined array shape, and the arrays can combined with other arrays to form an array grid. Characteristics, such as size, shape, material, and the like, of the individual V-spring elements can be varied throughout the array grid(s) to realize a dampening effect of the system, that is, a gradual recovery of shape after unloading, rather than a simple spring or "trampoline" effect, which results in reduced comfort. Use of V-spring elements that are repeatable with 3D printing techniques allows the structure to be readily shaped according to a predefined volume (a 3D model generated using computer-aided design (CAD) tools, for example). It is envisioned that the 3D-printed support apparatus described herein can be utilized myriad applications where a flexible layer is desired (e.g., to replace foam), including seats, pillows, mattresses, any type of cushion, and the like.

According to embodiments of the present disclosure, a method for forming a 3D-printed flexible support apparatus includes: producing arrays of V-spring elements using a 3D printing system, each array including a plurality of V-spring elements attached to one another and arranged in a predefined array shape, and each V-spring element having a predefined firmness or hysteresis characteristic; arranging the arrays of V-spring elements in at least one two-dimensional (2D) array grid using the 3D printing system, such that at least one V-spring element of each array is attached to a V-spring element of at least one adjacent array; and shaping the at least one array grid according to a predefined volume to form the support apparatus.

The method may further include: forming a plurality of the array grids using the 3D printing system; and vertically stacking the plurality of array grids using the 3D printing system, such that at least one V-spring element of each array is attached to a V-spring element of at least one array positioned above or below.

The method may further include: producing the arrays of V-spring elements using the 3D printing system, such that the plurality of V-spring elements included in each array extend radially from a center axis of the predefined array shape.

Furthermore, each V-spring element may include two arms having a first end at which the two arms are attached and an opposite second end, the arms extending angularly with respect to each other from their respective first end toward their respective second end. In this regard, the method may further include: producing the arrays of V-spring elements using the 3D printing system, such that the plurality of V-spring elements included in each array extend radially from a center axis of the predefined array shape, the respective second ends of each V-spring element in a given array being located on the center axis. In the given array, a second end of a V-spring element therein may be attached to second ends of other V-spring elements therein on the center axis. Further, in the given array, a second end of a first arm of the V-spring element therein may be attached to second ends of first arms of the other V-spring elements therein on the center axis, and a second end of a second arm of the V-spring element therein may be attached to second ends of second arms of the other V-spring elements therein on the center axis. Moreover, in the given array, a first end of a V-spring element therein may be attached to a first end of a V-spring element of at least one adjacent array in the array grid. Similarly, in the given array, a first end of a V-spring element therein may be attached to a first end of a V-spring element of a plurality of adjacent arrays in the array grid.

In addition, the predefined array shape may a hexagon. The predefined volume may be a 3D model defined using computer-aided design (CAD) techniques, and the predefined volume may be shaped as a seat pan.

The method may further include: defining the firmness or hysteresis characteristic for a given V-spring element; and producing the V-spring element according to the defined firmness or hysteresis characteristic using the 3D printing system. In this regard, a firmness or hysteresis characteristic of a first V-spring element in a given array may be different from a firmness or hysteresis characteristic of a second V-spring element in the given array. Further, an overall firmness or hysteresis characteristic of a first array may be different from an overall firmness or hysteresis characteristic of a second array adjacent to the first array. Even further, an overall firmness or hysteresis characteristic of a first section of arrays may be different from an overall firmness or hysteresis characteristic of a second section of arrays adjacent to the first section.

The method may further include: defining a size, shape, or material of the given V-spring element to achieve a desired firmness or hysteresis characteristic; and producing the V-spring element according to the defined size, shape, or material using the 3D printing system. Also, the method may further include: defining a width of the given V-spring element or a thickness of the given V-spring element to achieve a desired firmness or hysteresis characteristic; and producing the V-spring element according to the defined width or thickness using the 3D printing system. The defined width or thickness may refer to a center portion of the given V-spring element, and the defined width or thickness at the center portion may be different from a width or thickness at an end portion of the given V-spring element, respectively. The method may further include: providing a user interface to allow a user to select the firmness or hysteresis characteristic for the given V-spring element; and producing the V-spring element according to the selected firmness or hysteresis characteristic using the 3D printing system.

Additionally, the method may further include: shaping the at least one array grid according to dimensions of the predefined volume, such that the at least one array grid fits within the predefined volume.

Furthermore, according to embodiments of the present disclosure, a 3D-printed flexible support apparatus includes: arrays of V-spring elements produced using a 3D printing system, each array including a plurality of V-spring elements attached to one another and arranged in a predefined array shape, each V-spring element having a predefined firmness or hysteresis characteristic. The arrays of V-spring elements are arranged in at least one two-dimensional (2D) array grid using the 3D printing system, such that at least one V-spring element of each array is attached to a V-spring element of at least one adjacent array, and the at least one array grid is shaped according to a predefined volume.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 2A-2C illustrate various views of an exemplary V-spring element produced using a 3D printing system for constructing the 3D-printed flexible support structure;

FIGS. 3A-3D illustrate plan views of exemplary arrays of V-spring elements in various array shapes;

FIGS. 4A-4F illustrate various views of exemplary hexagonal V-spring element arrays;

FIGS. 6A-6D illustrate an exemplary procedure for shaping an array grid of V-spring arrays to a predefined volume to form the 3D-printed flexible support structure.

Figure 1:
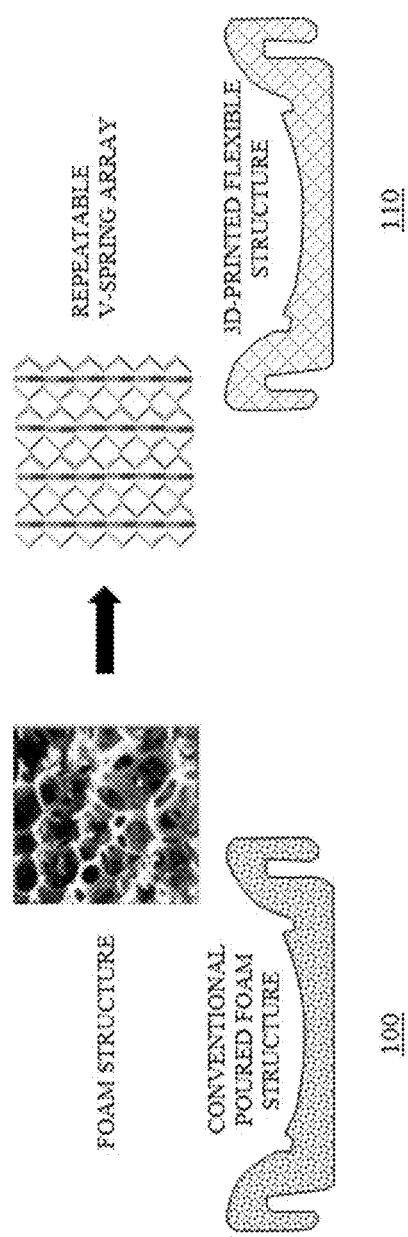
FIG. 1 illustrates a conventional foam structure contrasted with an exemplary 3D-printed flexible support apparatus in accordance with embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the terms "3D printing system," "3D printing techniques," "3D printing tools," "3D printer," and the like, encompass any and all systems, techniques, and processes known in the art to synthesize a three-dimensional object using successive layers of material formed under computer control. Since 3D printing systems and techniques are well-known in the art, a detailed description thereof will be omitted from the present disclosure in order to avoid limiting the scope of the embodiments to particular types or variants of 3D printing systems. In actuality, the embodiments should not be limited as such; rather, any computer-controlled system known in the art for creating a three-dimensional object using successive layers of material can be considered a "3D printing system" for the purposes of the present disclosure. The term "user," "designer," or similar term may encompass any person substantially capable of controlling and/or operating a 3D printing system.

Referring now to embodiments of the present disclosure, the disclosed techniques provide for manufacturing a 3D-printed flexible support apparatus that simulates the structure of a foam support apparatus. It is envisioned that the 3D-printed support apparatus described herein can be utilized myriad applications where a flexible layer is desired (e.g., to replace foam), including seats, pillows, mattresses, any type of cushion, and the like.

The 3D-printed flexible support apparatus utilizes repeatably producible V-spring elements that can be arranged in a desired shape to provide performance characteristics usually accomplished with polyurethane foam. Designers can control the firmness or degree of hysteresis of the structure, or even certain sections of the structure, by defining characteristics, such as size, shape, material, and the like, of the individual V-spring elements.

The V-spring elements can be grouped in arrays according to a predefined array shape, and the arrays can combined with other arrays to form an array grid. Varying the characteristics of the V-spring elements throughout the array grid(s) can realize a dampening effect of the system, that is, a gradual recovery of shape after unloading, rather than a simple spring or "trampoline" effect, which results in reduced comfort. Use of V-spring elements that are repeatable with 3D printing techniques allows the structure to be readily shaped according to a predefined volume (e.g., a CAD-generated 3D model generated).

FIG. 1 illustrates a conventional foam structure contrasted with an exemplary 3D-printed flexible support apparatus in accordance with embodiments of the present disclosure. As shown in FIG. 1, a conventional poured foam structure 100 is formed by pouring a foam structure into a mold, which in this case is formed as a seat pan. Then, during the foaming process, the mold fills the structure and provides flexibility and support. On the other hand, the 3D-printed flexible support structure 110, as described hereinbelow, is formed by repeatedly producing arrays of V-spring elements and shaping the arrays according to a predefined volume—a seat pan in this case. Because the individual V-spring elements—that is, the size, shape, material, arrangement, and so forth, of the V-spring elements—can be controlled using a 3D printing system, there is improved firmness control when making the 3D-printed flexible support structure 110, as opposed to the more random structures found in foam.

FIGS. 2A-2C illustrate various views of an exemplary V-spring element produced using a 3D printing system for constructing the 3D-printed flexible support structure 110. As shown in FIG. 2A, an individual V-spring element 200 can be a flexible spring (or spring-like) structure including two arms, a first arm 200a and a second arm 200b. The two arms 200a and 200b each have a first end at which the two arms are attached and an opposite second end. The arms 200a and 200b may extend angularly with respect to each other from their respective first end toward their respective second end, as shown in FIG. 2A. The two arms 200a and 200b may be linear or curved, somewhat resembling the shape of tweezers, such as the V-spring element 200 shown in FIG. 2A. However, the arms of the V-spring element 200 may be shaped in any suitable manner to realize a flexible, spring-like effect.

Characteristics—e.g., the size, shape, material, arrangement, and the like—of the V-spring elements 200 can be set using the 3D printing system. Varying the characteristics of individual V-spring elements 200, and more specifically, the characteristics of adjacent V-spring elements 200 in an array grid (described in further detail below), affects the firmness and/or hysteresis of the structure as a whole, or certain sections of the structure. In this manner, the firmness and/or hysteresis of the 3D-printed flexible support structure 110 can be defined by tuning these characteristics of the V-spring elements 200, and the V-spring elements 200 can be produced using the 3D printing system according to the defined firmness and/or hysteresis.

Notably, a designer of the 3D-printed flexible support structure 110 can modify the dimensions of individual V-spring elements 200, and can vary the dimensions of V-spring elements 200 throughout the 3D-printed flexible support structure 110, in any suitable manner to achieve a desired firmness and/or hysteresis characteristic. Further, the designer can set the shape (e.g., flat arms, inwardly curved arm, outwardly curved arms), the material (e.g., plastic-based material, rubber-based material, ceramic-based material, etc.), and the arrangement (e.g., array shape, array grid shape, etc. (described in further detail below)) of V-spring elements 200 in any suitable manner to achieve a desired firmness and/or hysteresis characteristic. The effect of such modifications on compression characteristics of the V-spring elements 200 would be understood by a person of ordinary skill in the art. In other words, the V-spring elements 200 shown in FIGS. 2A-2C, as well as those otherwise described herein, are shown merely for demonstration purposes and should not be treated as limiting the scope of the claimed invention thereto.

Therefore, as an example, FIGS. 2B and 2C illustrate exemplary V-spring elements 200 having modified dimensions that affect the compression characteristics of the V-spring element 200. FIG. 2B shows a top view of one exemplary V-spring element 200 having a center width that is set to be greater than a width of the ends, and FIG. 2C shows a side view of another exemplary V-spring element 200 having a center thickness that is set to be greater than a thickness of the ends. In this regard, increasing the center width and/or the center thickness of the V-spring element 200 allows for decreased "bending," or increased firmness; meanwhile, decreasing the center width and/or center thickness of the V-spring element 200 allows for increased "bending," or decreased firmness. Moreover, the height of the V-spring element 200 can be set (i.e., the distance between the respective second ends of the first arm 200a and second arm 200b), as well as the length of the V-spring element 200, to affect the compression characteristics thereof. For instance, the length of a V-spring element 200 can be set within a range of 0.5 mm and 10 mm, though the dimensions of V-spring elements 200 are not limited thereto.

The 3D printing system can combine multiple V-spring elements 200 in a predefined manner, such as a radial pattern, to form a 3D element—i.e., array 300—that can be arranged in a repeatable structure to form a two-dimensional (2D) grid of arrays. Arranging the individual V-spring elements 200 in arrays 300 enables the 3D-printed flexible support structure 110 to mimic the open-cell structure of foam. In this regard, FIGS. 3A-3D illustrate plan views of exemplary arrays 300 of V-spring elements 200 in various array shapes. FIG. 3A shows triangle-shaped arrays 300 of V-spring elements 200, FIG. 3B shows square-shaped arrays 300 of V-spring elements 200, FIG. 3C shows hexagon-shaped arrays 300 of V-spring elements 200, while FIG. 3D shows a vertical stack of the hexagon-shaped arrays 300 depicted in FIG. 3C. Notably, the V-spring elements 200 may be arranged in arrays 300 of any suitable shape. Thus, the array shapes shown in FIGS. 3A-3D are provided merely for demonstration purposes and should not be treated as limiting the scope of the claimed invention thereto.

Each array 300 can include a plurality of V-spring elements 200 arranged in a predefined array shape, such as a triangle (FIG. 3A), square (FIG. 3B), hexagon (FIG. 3C), or the like, using a 3D printing system. As shown in FIGS. 3A, 3B, and 3C, the V-spring elements 200 can be radially arranged in each array 300, such that the V-spring elements 200 extend radially from a center axis C of the array 300. That is, the innermost ends (i.e., second ends) of the V-spring elements 200 in each array 300 can be located on the center axis C, and the V-spring elements 200 extend outwardly therefrom. In this manner, the outermost ends (i.e., first ends) of the V-spring elements 200 in each array 300 can define a boundary that determines the array shape.

Further, the arrays 300 can be combined with other arrays 300 in a two-dimensional manner to form a 2D array grid 310, in which at least one V-spring element 200 of each array 300 is attached to a V-spring element 200 of at least one adjacent array 300. For instance, as shown in FIGS. 3A, 3B, and 3C, multiple arrays 300 of V-spring elements 200 are positioned adjacently to one another to form a 2D array grid 310, such that at least one V-spring element 200 of an array 300 is attached to a V-spring element 200 of at least one adjacent array 300. More specifically, the outermost end (i.e., first end) of at least one V-spring element 200 of a given array 300 can be attached to an outermost end (i.e., first end) of another V-spring element 200 of at least one adjacent array 300. In this manner, multiple V-spring arrays 300 can be horizontally linked together (in the x- and y-directions) to form a structurally sound 2D array grid 310.

The array grid 310 can eventually be shaped according to a predefined volume to form the 3D-printed flexible support structure 110, as described in further detail with respect to FIGS. 6A-6D. To this end, multiple array grids 310 can be formed using the 3D printing system and stacked atop one another (in the z-direction) to form a structure with a given height. As shown in FIG. 3D, a plurality of array grids 310—i.e., array grid 302, 304, 306 and 308—can be vertically stacked according to a desired height. To this end, at least one V-spring element 200 of a given array 300 may be attached to a V-spring element 200 of at least one array 300 positioned above or below the given array 300. Thus, a structurally sound 3D body, comprising multiple vertically stacked 2D array grids 310, can be formed.

Referring now to FIGS. 4A-4D, though the V-spring elements 200 may be arranged in arrays of any suitable shape using the 3D printing system, the hexagonal structure may be preferred because the V-spring elements 200 can be efficiently laid out in a stable array 300. Thus, the hexagonal array 300 is referenced specifically hereinbelow for simplification purposes.

Figure 4C:
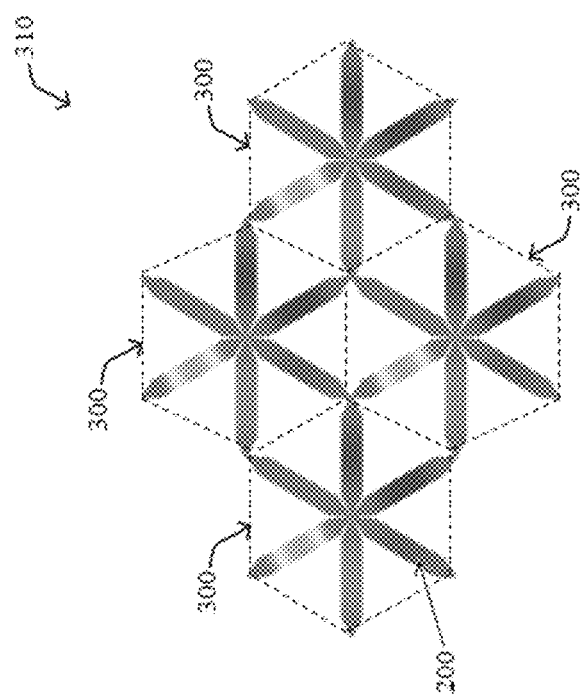

FIGS. 4A-4F illustrate various views of exemplary hexagonal V-spring element arrays 300. First, FIG. 4A shows a 3D view of an isolated hexagonal V-spring element array 300. The array 300 shown in FIG. 4A, which is produced by a 3D printing system to contain a plurality of V-spring elements 200 radially arranged in a hexagonal shape, can be centered along the center axis C. The V-spring elements 200 in the array 300 may extend radially from the center axis C (i.e., the center of the array 300). That is, the respective second ends of each V-spring element 200 can be located on the center axis C, and the V-spring elements extend outwardly from the center axis C toward the boundary of the array 300.

In addition, second ends of the V-spring elements 200 can be attached to one another to form a structurally sound array 300. When the V-spring elements 200 are radially arranged in the array 300, the second ends are attached to one another on the center axis C, as indicated by the imaginary dashed circles in FIG. 4A. Even more specifically, in the array 300, second ends of the first arms 200a can be attached to one another on the center axis C, while second ends of the second arms 200b can be attached to one another on the center axis C. Because the V-spring element 200 includes a first arm 200a and a second arm 200b having respective second ends that are vertically separated from one another (e.g., see FIGS. 2A and 2C), a 3D array 300 can be formed by combining the V-spring elements 200 in the manner shown in FIG. 4A.

FIG. 4B shows a 3D view of four hexagonal V-spring element arrays 300 arranged in a 2D array grid 310, and FIG. 4C shows a top view of the four hexagonal V-spring element arrays 300 shown in FIG. 4B. In the array grid 310, a first end of a V-spring element 200 in a given array 300 can be attached to a first end of a V-spring element 200 of at least one adjacent array 300, as indicated by the imaginary dashed circles in FIG. 4B. In this manner, the 3D printing system can produce a structurally sound grid 310 of V-spring arrays 300. Meanwhile, the first (outermost) ends of the V-spring elements 200 in an array 300 can define a boundary that determines the shape of the array 300, as indicated by the imaginary dashed lines in FIG. 4C.

Figure 4D:
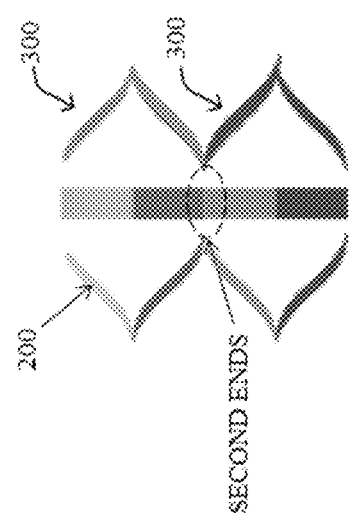

FIG. 4D shows a side view of vertically stacked hexagonal V-spring element arrays 300. The 3D printing system can produce arrays 300 of V-spring elements 200 that are vertically stacked on one another, such that at least one V-spring element 200 of a given array 300 is attached to a V-spring element 200 of at least one array 300 positioned above or below. More specifically, the second ends of V-spring elements 200 in a given array 300 may be connected (on the center axis C) to second ends of V-spring elements 200 in an array 300 that is above or below the given array 300. This allows for a 3D-printed flexible support structure 110 having a height that is greater than a height of a single V-spring element 200.

Figure 4E:
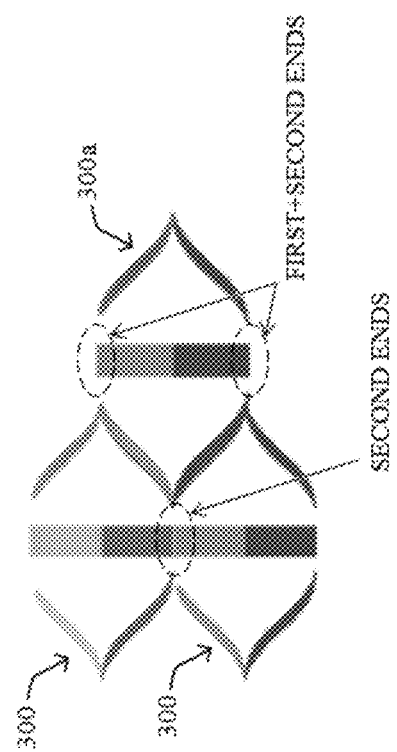
Figure 4F:
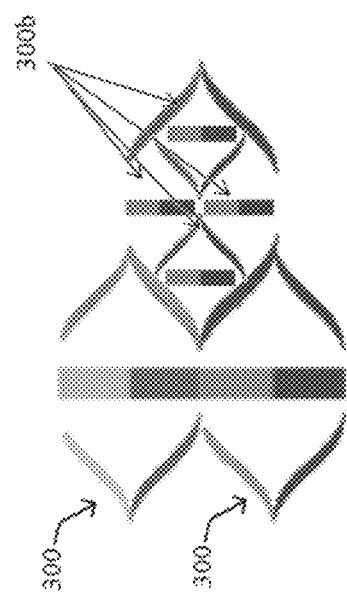

FIGS. 4E and 4F illustrate side views of variants of the vertically stacked hexagonal V-spring element arrays 300 shown in FIG. 4D. First, in FIG. 4E, the 3D printing system can produce a V-spring array 300a that is positioned laterally of the vertically stacked arrays 300 shown in FIG. 4D. To this end, the first (outermost) ends of V-spring elements 200 in the vertically stacked arrays 300 can attach to the second (innermost) ends of V-spring elements 200 in the lateral array 300a. The lateral array 300a can provide additional support for the vertically stacked arrays 300, as well as additional firmness.

Similarly, in FIG. 4F, the 3D printing system can produce a plurality of smaller V-spring arrays 300b that are positioned laterally, as a group, of the vertically stacked arrays 300 shown in FIG. 4D. The group of smaller arrays 300b can link (i.e., attach) to the vertically stacked arrays 300 in the same manner as the lateral array 300a in FIG. 4E. As explained above, the dimensions of the V-spring elements 200 produced by the 3D printing system can set in any suitable manner. As shown in FIG. 4F, V-spring arrays 300 of differing sizes, shapes, materials, arrangements, etc. can be combined together in the 3D-printed flexible support structure 110. Accordingly, a designer can achieve a specific feel or structure by varying such characteristics throughout the formation.

For instance, smaller arrays, such as the arrays 300b, can be used to create smoother contours and improve feel for the user. The diameter for such arrays can be set within, for example, a range of 1 mm to 5 mm Medium-sized arrays, such as the arrays 300, can be used for creating basic structure. The diameter for such arrays can be set within, for example, a range of 5 mm to 10 mm Meanwhile, larger-sized arrays can be used for filling larger structural spaces or for ventilation and can have a diameter that is set within, for example, a range of 10 mm to 20 mm. It should be understood that the above dimensions are provided merely for demonstration purposes and do not limit the scope of the claimed invention thereto.

As described above, deflection or compression performance of the V-spring arrays 300 in the 3D-printed flexible support structure 110 can be controlled by varying the spring constant of the individual V-spring elements 200 to create areas of localized firmness. For instance, characteristics such as the size, shape, material, and the like of the V-spring elements 200 can affect the spring constant thereof and, as a result, the firmness of the 3D-printed flexible support structure 110 or certain sections thereof.

Similarly, varying the firmness of adjacent V-spring elements 200 or adjacent V-spring arrays 300 can change the hysteresis or damping characteristics of the 3D-printed flexible support structure 110. In this regard, hysteresis of 3D-printed flexible support structure 110 refers to a measure of the energy lost or absorbed by the structure when subjected to deflection (i.e., loading). Thus, hysteresis of the 3D-printed flexible support structure 110 indicates a difference between the loading energy and unloading energy. Put another way, once a load on the 3D-printed flexible support structure 110 is removed, the rate at which the 3D-printed flexible support structure 110 returns to its resting state and unloads potential energy—stored during loading of the structure—is affected by the degree of hysteresis of the structure.

The designer of the 3D-printed flexible support structure 110 may be able to define specific levels of firmness and hysteresis for the 3D-printed flexible support structure 110 as a whole, certain sections thereof, specific V-spring arrays 300, or even individual V-spring elements 200. Using the 3D printing system, arrays 300 of V-spring elements 200 can be produced according to the defined firmness and/or hysteresis characteristic.

Figure 5:
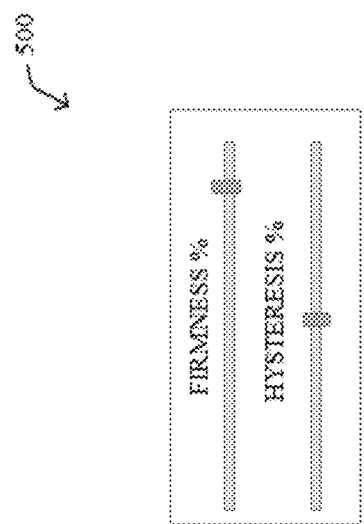
FIG. 5 illustrates an exemplary user interface including an input means for defining firmness and hysteresis characteristics of the 3D-printed flexible support structure.

To this end, a user interface may be provided for defining a level of firmness or hysteresis in the structure 110, e.g., using the input means 500 shown in FIG. 5. The designer can select a desired level of firmness or hysteresis (or other similar compression-related characteristic) through the user interface. Further, the designer can designate his or her selection for a specific V-spring element 200, a specific V-spring array 300, a specific section of the 3D-printed flexible support structure 110, or the structure as a whole. The designer can manually designate certain portions of the 3D-printed flexible support structure 110 for tuning, or the 3D printing system can automatically tune certain portions of the 3D-printed flexible support structure 110 based on the designer's input. As an example, the designer can define a firmness level for outer sections of the 3D-printed flexible support structure 110, and the system can automatically select appropriate dimensions, shapes, arrangements, and the like of the V-spring elements 200 and arrays 300 within said sections. Thus, the firmness or hysteresis can differ throughout the 3D-printed flexible support structure 110 in varying levels of granularity to achieve a certain feel or shape, depending on the designer's preferences. It should be understood that the input means 500 shown in FIG. 5 is depicted as a slider for demonstration purposes only and may be modified in any manner suitable for receiving user input, such as a text box, button, or the like. Further, the input means 500 can be used to input a percentage, an alphanumeric value, or the like.

FIGS. 6A-6D illustrate an exemplary procedure for shaping an array grid 310 of V-spring arrays 300 to a predefined volume to form the 3D-printed flexible support structure 110. First, as shown in FIG. 6A, the designer can provide a 3D predefined volume 600 according to which the 3D-printed flexible support structure 110 is shaped. The predefined volume 600 can be a 3D model generated using, for instance, computer-aided design (CAD) techniques, as would be understood to one of ordinary skill in the art. The volume 600 can be defined in any shape as would be suitable for a flexible support, including, but not limited to, a seat pan, a head rest, a pillow, a mattress, a seat cushion or pad, and so forth. Once the predefined volume 600 is generated (e.g., using CAD tools), the volume 600 or model can be uploaded to the 3D printing system so the system can produce the V-spring arrays 300 according to the uploaded volume 600.

Next, as shown in FIG. 6B, the designer can define firmness and/or hysteresis characteristics of the volume 600. For instance, the designer can assign a particular degree of firmness and/or hysteresis (e.g., using input means 500) to specific areas of the volume 600. In FIG. 6B, the designer selects outer sections A and C of the volume 600 as firmer than the center section B. Alternatively, the designer can assign a particular degree of firmness and/or hysteresis (or other characteristics, as described above) for the structure 110 as a whole, or specific arrays 300, or even specific V-spring elements 300.

Next, as shown in FIG. 6C, the 3D printing system can produce arrays 300 of V-spring elements 200 according to a predefined array shape, material, shape, size, and so forth, as described in detail above. The 3D printing system can produce the V-spring arrays 300 in an arranged manner to formulate a 2D array grid 310, and vertically stack multiple array grids 310, if necessary, that is automatically shaped according to dimensions of the predefined volume 600, such that the array grid(s) 310 fits within the predefined volume 600. Alternatively, the array grid(s) 310 can be overlaid on the predefined volume 600 and trimmed to size according to the volume boundary. That is, a premade array grid 310 can be manually shaped according to a desired volume 600.

The V-spring elements 200 are produced by the 3D printing system according to the predefined firmness and/or hysteresis characteristic (or other predefined characteristics). If a designer specifies degrees of firmness and/or hysteresis for certain sections of the volume 600, i.e., as shown in FIG. 6B, the 3D printing system can automatically select the firmness of particular V-spring arrays 300 or individual V-spring elements 200 to achieve the specified firmness and/or hysteresis. As shown in FIG. 6C, firmer V-spring arrays 300 can be produced by the 3D printing system for the outer sections A and C of the volume 600, while softer V-spring arrays 300 can be produced by the 3D printing system for the inner section B of the volume 600. Furthermore, the firmness, hysteresis, or other characteristics of the arrays 300 can be varied throughout the structure 110, as varying the firmness of adjacent arrays 300—shown in FIG. 6C—changes the hysteresis or damping characteristics of the structure. Thus, the characteristics of the V-spring elements 200 can be automatically selected and applied by the 3D printing system or manually defined by the designer.

Lastly, as shown in FIG. 6D, one or more array grids 310 can be shaped according to the predefined volume 600, such that the V-spring arrays 300 fit within the volume 600. The array grid(s) 310 can be shaped automatically by the 3D printing system or manually shaped, e.g., using a premade array grid 310 and trimmed to size. The result is a customized 3D-printed flexible support structure 110 in the shape of the predefined volume 600 having a predefined firmness and/or hysteresis. For instance, in FIG. 6D, the structure 110 is produced by the 3D printing system as having firmer outer sections A and C and a softer inner section B. The structure 110 can be configured to have sections of particular firmness and/or hysteresis in any suitable manner, as desired by the designer.

Accordingly, the 3D-printed flexible support apparatus described herein allows for 3D printing of flexible structures and soft-touch surfaces. Using a 3D printing system in the manner described hereinabove reduces the manufacturing variability typically associated with traditional manufacturing approaches (e.g., poured foam structures) and reduces the assembly requirements, as the flexible structure can be produced by the 3D printing system in one step. Additionally, there is improved firmness/softness control over the manufactured structure, since characteristics of individual V-spring elements are controlled as opposed to the random structures found in foam.

While there have been shown and described illustrative embodiments that provide for a 3D-printed flexible support apparatus and methods for producing the same, it is to be understood that various other adaptations and modifications may be made within the spirit and scope of the embodiments herein. Thus, the embodiments may be modified in any suitable manner in accordance with the scope of the present claims.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for forming a three-dimensionally (3D) printed flexible support apparatus, the method comprising:
producing arrays of V-spring elements using a 3D printing system, each array including a plurality of V-spring elements attached to one another and arranged in a predefined array shape, and each V-spring element having a predefined firmness or hysteresis characteristic;
arranging the arrays of V-spring elements in at least one two-dimensional (2D) array grid using the 3D printing system, such that at least one V-spring element of each array is attached to a V-spring element of at least one adjacent array; and
shaping the at least one array grid according to a predefined volume to form the support apparatus.

2. The method of claim 1, further comprising:
forming a plurality of the array grids using the 3D printing system; and
vertically stacking the plurality of array grids using the 3D printing system, such that at least one V-spring element of each array is attached to a V-spring element of at least one array positioned above or below.

3. The method of claim 1, further comprising:
producing the arrays of V-spring elements using the 3D printing system, such that the plurality of V-spring elements included in each array extend radially from a center axis of the predefined array shape.

4. The method of claim 1, wherein each V-spring element includes two arms having a first end at which the two arms are attached and an opposite second end, the arms extending angularly with respect to each other from their respective first end toward their respective second end.

5. The method of claim 4, further comprising:
producing the arrays of V-spring elements using the 3D printing system, such that the plurality of V-spring elements included in each array extend radially from a center axis of the predefined array shape, the respective second ends of each V-spring element in a given array being located on the center axis.

6. The method of claim 5, wherein, in the given array, a second end of a V-spring element therein is attached to second ends of other V-spring elements therein on the center axis.

7. The method of claim 6, wherein, in the given array, a second end of a first arm of the V-spring element therein is attached to second ends of first arms of the other V-spring elements therein on the center axis, and a second end of a second arm of the V-spring element therein is attached to second ends of second arms of the other V-spring elements therein on the center axis.

8. The method of claim 5, wherein, in the given array, a first end of a V-spring element therein is attached to a first end of a V-spring element of at least one adjacent array in the array grid.

9. The method of claim 5, wherein, in the given array, a first end of a V-spring element therein is attached to a first end of a V-spring element of a plurality of adjacent arrays in the array grid.

10. The method of claim 1, wherein the predefined array shape is a hexagon.

11. The method of claim 1, wherein the predefined volume is a 3D model defined using computer-aided design (CAD) techniques.

12. The method of claim 1, wherein the predefined volume is shaped as a seat pan.

13. The method of claim 1, further comprising:
defining the firmness or hysteresis characteristic for a given V-spring element; and
producing the V-spring element according to the defined firmness or hysteresis characteristic using the 3D printing system.

14. The method of claim 13, wherein a firmness or hysteresis characteristic of a first V-spring element in a given array is different from a firmness or hysteresis characteristic of a second V-spring element in the given array.

15. The method of claim 13, wherein an overall firmness or hysteresis characteristic of a first array is different from an overall firmness or hysteresis characteristic of a second array adjacent to the first array.

16. The method of claim 13, wherein an overall firmness or hysteresis characteristic of a first section of arrays is different from an overall firmness or hysteresis characteristic of a second section of arrays adjacent to the first section.

17. The method of claim 13, further comprising:
defining a size, shape, or material of the given V-spring element to achieve a desired firmness or hysteresis characteristic; and
producing the V-spring element according to the defined size, shape, or material using the 3D printing system.

18. The method of claim 13, further comprising:
defining a width of the given V-spring element or a thickness of the given V-spring element to achieve a desired firmness or hysteresis characteristic; and
producing the V-spring element according to the defined width or thickness using the 3D printing system.

19. The method of claim 18, wherein the defined width or thickness refers to a center portion of the given V-spring element, and the defined width or thickness at the center portion is different from a width or thickness at an end portion of the given V-spring element, respectively.

20. The method of claim 13, further comprising:
providing a user interface to allow a user to select the firmness or hysteresis characteristic for the given V-spring element; and
producing the V-spring element according to the selected firmness or hysteresis characteristic using the 3D printing system.

21. The method of claim 1, further comprising:
shaping the at least one array grid according to dimensions of the predefined volume, such that the at least one array grid fits within the predefined volume.

* * * * *